(12) United States Patent
Huber et al.

(10) Patent No.: US 7,778,414 B2
(45) Date of Patent: Aug. 17, 2010

(54) ENCRYPTION METHOD BASED ON FACTORIZATION

(75) Inventors: Klaus Huber, Darmstadt (DE); Matthias Baumgart, Gießen (DE); Tim Schneider, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 1153 days.

(21) Appl. No.: 10/520,251

(22) PCT Filed: Jun. 11, 2003

(86) PCT No.: PCT/DE03/01917

§ 371 (c)(1),
(2), (4) Date: Jul. 27, 2005

(87) PCT Pub. No.: WO2004/006496

PCT Pub. Date: Jan. 15, 2004

(65) Prior Publication Data
US 2006/0013403 A1    Jan. 19, 2006

(30) Foreign Application Priority Data
Jul. 3, 2002    (DE) ................. 102 29 811

(51) Int. Cl.
| H04K 1/00 | (2006.01) |
| H04L 9/00 | (2006.01) |
| H04L 9/30 | (2006.01) |
| H04L 9/28 | (2006.01) |
| H04L 9/08 | (2006.01) |
| H04L 9/32 | (2006.01) |

(52) U.S. Cl. .................. 380/30; 380/28; 380/282; 380/285; 713/181

(58) Field of Classification Search .......... 380/30, 380/285
See application file for complete search history.

(56) References Cited

U.S. PATENT DOCUMENTS

| 4,686,614 | A |   | 8/1987  | Costello |       |
| 5,528,481 | A |   | 6/1996  | Caldeira et al. |  |
| 5,577,124 | A | * | 11/1996 | Anshel et al. ................. 380/46 |
| 5,642,274 | A |   | 6/1997  | Zahnen et al. |  |
| 5,818,703 | A |   | 10/1998 | Jacobson |  |
| 5,818,708 | A |   | 10/1998 | Wong |  |
| 6,052,467 | A | * | 4/2000  | Brands ........................ 380/279 |
| 6,266,411 | B1 | * | 7/2001 | Etzel et al. .................... 380/28 |
| 6,553,120 | B1 | * | 4/2003 | Vaudenay ..................... 380/28 |
| 6,792,108 | B1 | * | 9/2004 | Patera et al. .................. 380/43 |
| 6,876,744 | B1 | * | 4/2005 | Etzel et al. .................... 380/28 |
| 2002/0034300 | A1 | * | 3/2002 | Thuvesholmen et al. .... 380/256 |
| 2005/0147240 | A1 | * | 7/2005 | Agrawal et al. .............. 380/28 |

FOREIGN PATENT DOCUMENTS

| DE | 10034527 | 1/2002 |
| EP | 0805253 | 11/1997 |
| EP | 0852281 A2 | 7/1998 |
| EP | 1091078 | 4/2001 |
| FR | 2692418 | 12/1993 |

OTHER PUBLICATIONS

Cocks, An Identity Based Encryption Scheme Based on Quadratic Residues, Cryptography and Coding 2001, LNCS 2260, pp. 360-363, 2001.*

Rao et al., Private-Key Algebraic-Code Encryptions, IEEE Transactions on Information Iheory. vol. 35. No. 4. Jul. 1989.*

Koyama K., "Security and Unique Decipherability of Two-Dimensional Public Key Cryptosystems", Transactions of the IEICE, E 73(7): 1058-1067, 1990.

Varadharajan V, "Cryptosystems Based on Permuation Polynomials", International Journal of Computer Mathematics, Gordon and Breach publishers, London, 23(3/4): 237-250, 1988.

Shamir A., "Efficient Signature Schemes Based on Birational Permuations", Advances in Cryptology, Crypto '93, Conference Proceedings. pp. 1-12, 1993.

Lin et al., "Modified Lu-Lee Cryptosystems", Electronics Letters, 23(13):826, 1989.

Schwenk et al., "Public Key Encryption and Signature Schemes Based on Polynomials Over Z N", Advances in Cryptology—Eurocrypt '96. LNCS 1070, Springer-Verlag Berlin Heidelberg, pp. 60-71, 1996.

(Continued)

*Primary Examiner*—Taghi T Arani
*Assistant Examiner*—Morshed Mehedi
(74) *Attorney, Agent, or Firm*—Kenyon & Kenyon LLP

(57) ABSTRACT

The present invention relates to an asymmetrical encryption method. The public key is made up of a large composite number n; the private key is made up of the factors of the composite number. The encryption is made up of a number of iterations of individual encryption steps that are successively reversed during the decryption. In this context, the reversal of an individual encryption step requires the solving of a quadratic equation modulo m [sic]. The private key is preferably made up of the large prime numbers p and q. The public key is the product n of these two prime numbers, as well as a comparatively small integer L which is greater than one. The message m is made up of two integral values $m_1$ and $m_2$, thus $$m=(m_1, m_2),$$

both values being in the set $Z_n=\{0, 1, 2, \ldots, n-1\}$.

The encryption is accomplished via the equation $$c=f^L(m).$$

15 Claims, No Drawings

OTHER PUBLICATIONS

Patarin et al., "Trapdoor One-Way Permutations and Multivariate Polynomials", Information and Communications Security. International Conference ICIS Proceedings, XX, XX. pp. 1-21, 1997.

R. L. Rivest, A. Shamir, L. Adleman, "A Method for Obtaining Digital Signatures and Public Key Cryptosystems", Communications of the ACM, vol. 21 No. 2, pp. 120-126, Feb. 1978.

M. 0. Rabin, "Digitalized Signatures and Public-Key Functions as as [sic] intractable as Factorization", MIT/LCS/TR-212, 1979.

E. Bach, J. Shallit, "Algorithmic Number Theory", vol. I, Efficient Algorithms, The MIT Press, Cambridge, Massachusetts, 1996.

H. Williams, "A Modification of the RSA Public-Key Equation Procedure", IEEE Transactions on Information Theory, vol. IT-26, No. 6, Nov. 1980.

Menezes et al., "Handbook of Applied Cryptography", CRC Press, 1996.

\* cited by examiner

ENCRYPTION METHOD BASED ON FACTORIZATION

SUMMARY

The present invention provides a method for encrypting data according to an asymmetrical method, based on a factorization problem, having a public key and a private key; the public key being the iteration number L as well as the composite number n, n preferably being the product of a plurality of large prime numbers; the private key is made up of the factorization of n; the message $m=(m_1, m_2)$ to be encrypted is made up of at least components $m_1$ and $m_2$; an encryption function $f(x)$ is iterated a total of L times, with $c=(c_1, c_2)=f^L(m)$; $f(m)=(f_1(m), f_2(m))$ being applicable, and $f_1=(m_1 \text{ op}_1 m_2)$ mod n as well as $f_2=(m_1, \text{op}_2 m_2)$ mod n; $\text{op}_1$ being, for example, an addition and $\text{op}_2$ being, for example, a multiplication. The encryption function $f(x)$ is selected in such a way that the encryption iteration can be reversed by the L-fold solution of a quadratic equation modulo n, it thus being possible to retrieve the original message from the encrypted information $c=(c_1, c_2)$. In an embodiment, a multivaluedness of the quadratic equation is eliminated by additional bits of $a_i$, and $b_i$. In an embodiment, the multivaluedness of the quadratic equation is eliminated by calculating a parity and a Jacobi symbol which, for example, in the case of prime numbers of form 3 mod 4, can be communicated by 2 bits per iteration step. In an embodiment, general iterations $f_1=(k_1 \cdot m_1 + k_2 \cdot m_2)$ mod n as well as $f_2=(k_3 \cdot m_1 \cdot m_2)$ mod n are used, constants being part of the public key. In an embodiment, the composite number n as public key contains more than two factors. In an embodiment, the message is now made up of an N-tuple $m=(m_1 \ldots \cdot m_n)$, the formula for the Lth iteration step using dependencies of N values in each iteration step. In an embodiment, the multivaluedness is resolved by additional bits that are derived from the values obtained in each iteration. In an embodiment, the multivaluedness is resolved by redundancy in the transmitted data.

The present invention provides a method for generating a signature, wherein a signature is generated by interchanging the encryption and decryption steps from one or more of the method embodiments described herein. The present invention provides a software for a computer which implements one or more of the method embodiments described herein. That is, the software is instructions configured to be executed by the computer; the instructions which, when executed by the computer, cause the performance of one or more of the method embodiments described herein. The present invention provides for a data carrier for a computer, characterized by the storage of software for the computer which implements one or more of the method embodiments described herein.

DETAILED DESCRIPTION

The present invention relates to an asymmetrical and public encryption method. In particular, the invention relates to a method for encrypting data on the basis of the factorization problem. In this context, the decryption of encrypted data is as complex as the problem of finding large prime divisors of large numbers. In detail, in the present invention, quadratic equations are to be solved for the decryption.

Encryption methods are used to protect data from unauthorized access when stored or during transmission over insecure communication channels. In so doing, the data are changed in such a way that this change cannot be undone without knowledge of a specific key. Encryption methods may be subdivided into the categories of asymmetrical and symmetrical. In symmetrical methods, the same key is used both for encryption and for decryption. Asymmetrical methods have two different keys, of which one is used for encryption and the other for decryption. In this context, all users can know the encryption key, whereas the decryption key must be kept secret. Therefore, the encryption key is also known as the public key, and the decryption key as the private key. Book [1] according to the literature list, for example, offers an overview of modern encryption methods.

The methods of Rabin ([3]) and Williams ([6]), which likewise utilize quadratic equations, are known. However, in these methods, only half the data bits is sent per transmission. Corresponding complexity restrictions thereby arise, and a greater demand for computing power during the encryption and the decryption.

Using polynomials of the second degree, the method of Schwenk and Eisfeld ([5]) offers little security against attacks which take advantage of the dependencies of message parts $m_1$ and $m_2$ on one another.

The objective is achieved by an invention having the features delineated in the independent claims. An asymmetrical encryption method is thereby described based on the factorization problem. It has less complexity than the RSA method in the encryption, and is able to transmit more data bits per encryption than the Rabin method or Williams method.

As already described above, the present invention concerns an asymmetrical encryption method. The public key is made up of a large composite number n; the private key is made up of the factors of the composite number. The encryption is made up of a number of iterations of individual encryption steps that are successively reversed during the decryption. The reversal of an individual encryption step requires the solving of a quadratic equation modulo n (see below). Such a quadratic equation can only be easily solved if the factors of n are known.

The private key is preferably made up of the large prime numbers p and q. The public key is the product n of these two prime numbers, as well as a comparatively small integer L which is greater than one. Message m is made up of two integral values $m_1$ and $m_2$, so that $$m=(m_1, m_2),$$

both values lying in the set $Z_n=\{0, 1, 2, \ldots, n-1\}$.

The encryption is accomplished via the equation $$c=f^L(m)$$

In the present case, encrypted value c is likewise made up of a double tuple of integers from $Z_n$, that is, $c=(c_1, c_2)$.

Function $f^L(m)$ is recursively defined by $$f^{j+1}(m)=f(f^j(m)).$$

For j=1, $f^1(m)=f(m)=(f_1(m), f_2(m))$ applies, where $$f_1(m)=m_1+m_2 \text{ mod n}$$

$$f_2(m)=m_1 \cdot m_2 \text{ mod n}.$$

The encrypted text is therefore obtained by the recursions $$a_{i+1}=a_i+b_i \text{ mod } n \quad (1)$$

$$b_{i+1}=a_i \cdot b_i \text{ mod } n. \quad (2)$$

with the starting values $a_0=m_1$, $b_0=m_2$ and the final values $c_1=a_L$, $c_2=b_L$.

For the decryption, one must be able to reverse the recursion. This is accomplished by solving the above equations for $a_i$ and $b_i$. One immediately obtains the quadratic equation $$z^2 - a_{i+1} \cdot z + b_{i+1} = 0 \bmod n, \quad (3)$$

which has $a_i$ and $b_i$ as solutions. The problem of the further solutions of equation (3) will be discussed later. If n is the product of very large prime numbers, then the solution of quadratic equations without knowledge of the prime factors is presumably a very difficult problem. With knowledge of the prime factors, however, this is possible without difficulty. The current methods for taking the root modulo n are described in detail in [2].

To ensure the security of the encryption system, the recursion must be performed at least twice, since otherwise, if it is performed exactly one time, the message parts $m_1$ and $m_2$ enter in linear fashion into the term $a_1 = m_1 + m_2$.

Another important aspect is the selection of the correct roots for the decryption.

If the number n contains exactly two prime factors p and q, equation (3) has four solutions. With a few bits for each $a_i$, i=1, 2, ..., L, the sender is able to eliminate multivaluedness for the legitimate receiver. To resolve the multivaluedness, for example, error detection characters or parity characters may in each case be derived from $a_i$.

In the most favorable case, 2 bits per iteration step are needed to completely resolve the multivaluedness in each step. The 4 solutions of equation (3) are given by $$z_{i_{1,2,3,4}} = \frac{a_{i+1}}{2} + w_{i_{1,2,3,4}} \bmod n \quad (4)$$

where $$w_{i_{1,2,3,4}} = \sqrt{a_{i+1}^2/4 - b_{i+1}} \bmod n$$

are the four square roots of the above expression modulo n.
The four values are connected as follows:

$$w_{i_1} = -w_{i_2} \bmod n \text{ and } w_{i_3} = -w_{i_4} \bmod n$$

We select the parity (even, odd) of the four roots so that $$w_{i_{1,3}} = \text{even and } w_{i_{2,4}} = \text{odd}$$

One particularly elegant solution making it possible to differentiate all four roots from one another is as follows for $p \equiv q \equiv 3 \bmod 4$:

In addition to parity, the so-called Jacobi symbol ($w_i/n$) is used as a further discriminant criterion (for theory and efficient calculation, see, for example, [2]). For non-trivial values of $w_i$, as are needed in the decryption, the Jacobi symbol supplies the value 1 or −1. The Jacobi symbol can be calculated with expenditure $O(\log^2 n)$.

The parity and the Jacobi symbol are sufficient for precisely selecting one of the four roots $w_{i_{1,2,3,4}}$. The parity and the Jacobi symbol are able to be coded using 2 bits. By appending these two bits in each of the L iteration steps, the legitimate receiver is given the ability to reverse the L iteration steps.

The root leading to solution $a_i$ in equation (4) is designated by $w_i$, thus, $a_i = a_{i+1}/2 + w_i \bmod n$. The parity and the Jacobi symbol are each specified with respect to this root. With the establishment of the value of $a_i$, the value for $b_i$ then follows immediately as $b_i = a_{i+1} - a_i \bmod n$. In summary, one thus obtains $$a_i = a_{i+1}/2 + w_i \bmod n \quad (5)$$

$$b_i = a_{i+1}/2 - w_i \bmod n. \quad (6)$$

In the encryption, at each step, from the number pair $(a_i, b_i)$, the pair $(a_{i+1}, b_{i+1})$ is calculated, as well as the parity and the Jacobi symbol of $wi = (a_i - a_{i+1}/2) \bmod n$.

With knowledge of the factorization, these steps can each be reversed by solving $$\sqrt{a_{i+1}^2/4 - b_{i+1}} \bmod n,$$

parity and Jacobi symbol of this root being represented.

Another important aspect is the parameter selection. At present, realistic orders of magnitude for each of the two prime numbers are from approximately 510 bits, i.e., n has a length of approximately 1020 bits. For L, a magnitude $O(\log \log n)$ is recommended; for n of 1000 bits, a value of approximately 3-10.

The bit lengths to be selected in the future may be oriented to the parameters of the RSA method.

An advantage of the method presented here is that the quantity of useful data is twice as great as in comparable methods.

Using standard algorithms, an encryption complexity of $O(L \log^2 n)$ is reached, if one calculates the expenditure for a multiplication using $O(\log^2 n)$. When using current algorithms, one must reckon with an expenditure of $O(L \log^3 n)$ for the decryption complexity. If an order of magnitude of $O(\log \log n)$ is selected for L, a time advantage (in addition to the greater useful-data rate) results for the encryption compared to the RSA method.

As in the case of the Rabin method and Williams method, care must be taken in the implementation that, in each case, only the correct roots of equation (3) exit the decoder during the decryption, since otherwise the number n can be factored.

In another refinement, as in the RSA method, module [sic] n may also contain more than two large prime factors. Naturally, the number of solutions for equation (3) also increases accordingly.

A further generalization is achieved by introducing additional constants in the recursion:

$$a_{i+1} = k_1 \cdot a_i + k_2 \cdot b_i \bmod n$$

$$b_{i+1} = k_3 \cdot a_i \cdot b_i \bmod n,$$

which are made known as part of the public key. The decoding is performed in correspondingly modified form.

In another specific embodiment, the magnitude of the tuple is altered. Instead of working with double tuples $m = (m_1, m_2)$, it is also possible to work with q tuples. In the following, the expansion based on triple tuples is illustrated. The message is now made up of the triple tuple $$m = (m_1, m_2, m_3)$$

The formula for the Lth iteration step is still $$f^{l+1}(m) = f(f^l(m)),$$

the basic iteration $f^1(m) = (f_1(m), f_2(m), f_3(m))$, however, being formed as follows:

$$f_1(m) = m_1 + m_2 + m_3 \bmod n$$

$$f_2(m) = m_1 \cdot m_2 + m_1 \cdot m_3 + m_2 \cdot m_3 \bmod n$$

$$f_3(m) = m_1 \cdot m_2 \cdot m_3 \bmod n.$$

The inverse calculation is accomplished by solving a third-degree equation. The roots may again be discriminated by information (parity symbol, Jacobi symbol, etc.) derived accordingly from the interim results. The expansion to degrees greater than or equal to four may be accomplished in analogous manner. In the iteration, essentially the elementary-symmetric Newtonian terms must be considered, to which additional constants, as already described above, may be added.

In the following, the method of the present invention is elucidated in light of an example. For reasons of clarity, the numbers in the following are selected to be very small. Let us say n=8549=p·q, with the private prime numbers p=83 and q=103. Let us assume the number of iterations L=3, and the message to be encrypted is given by m=$(m_1, m_2)$=(123,456). Even parity is coded by a zero, uneven parity by a one. Parity bit $b_p$ is used for this. If the Jacobi symbol is equal to one, a one is coded, if it is equal to minus one, a zero is coded. Jacobi bit $b_J$ is used for this.

The following values are obtained $(a_0, b_0)$=(123,456)

$(a_1, b_1)$=(579,4794)

$(a_2, b_2)$=(5373,5850)

$(a_3, b_3)$=(2674,5926)

To each of the three pairs $(a_1, b_1)$, $(a_2, b_2)$ and $(a_3, b_3)$, L·2 bits of parity bits and Jacobi bits, given in the example by the following binary vector $(b_{P_3}, b_{J_3}, b_{P_2}, b_{J_2}, b_{P_1}, b_{J_1})$=(0,0,1,1,0,1), are also added.

Initially, the receiver determines the four roots $w_{2_{1,2,3,4}}$=1629,4036,4513,6920. Based on $b_{P_3}$=0, the receiver recognizes that the correct root is even. Thus, only 4036 and 6920 remain. Of these (4036/8549)=−1 and (6920/8549)=1. $b_{J_3}$=0 implies that 4036 is the correct selection. An analogous procedure leads to the complete decryption.

In certain application cases, e.g. when the unencrypted message m contains redundancy, it is possible to dispense with the co-transmission of the bits for resolving the multi-valuedness. For example, this is the case for normal texts or when a so-called hash value was already placed in m. However, this is done at a decryption expenditure increased by a factor of $4^L$. Corresponding compromises are likewise possible; for example, the specification of only the parity in each of the L steps reduces the number of bits to be co-transmitted to L bits, and increases the decryption expenditure by the factor $2^L$.

As in the asymmetrical methods known in the literature ([1], [3], [4], [5]), a so-called digital signature method may be attained essentially by the interchange of encryption operations and decryption operations in the proposed method as well.

In embodiments of the present invention, a data carrier for a computer is provided. The data carrier being a software storage device.

LIST OF THE CITED LITERATURE

[1] A. J. Menezes, P. C. van Oorschot, S. A. Vanstone, "Handbook of Applied Cryptography", CRC Press, 1996.

[2] E. Bach, J. Shallit, "Algorithmic Number Theory", Vol. 1, Efficient Algorithms, The MIT Press, Cambridge, Mass., 1996.

[3] M. O. Rabin, "Digitalized Signatures and Public-Key Functions as [sic] intractable as Factorization", MIT/LCS/TR-212, 1979.

[4] R. L. Rivest, A. Shamir, L. Adleman, "A Method for Obtaining Digital Signatures and Public Key Cryptosystems", Communications of the ACM, Vol. 21 No. 2, pp. 120-126, February 1978.

[5] J. Schwenk, J. Eisfeld, "Public Key Encryption and Signature Schemes based and [sic] Polynomials over $Z_n$,", Eurocrypt 1996, LNCS 1070, Springer-Verlag Berlin Heidelberg 1996.

[6] H. Williams, "A Modification of the RSA Public-Key Equation Procedure", IEEE Transactions on Information Theory, Vol. IT-26, No. 6, November 1980.

What is claimed is:

1. A method for encrypting data according to an asymmetrical method using a processor, based on a factorization problem, comprising:

providing a public key to the processor; and providing a private key to the processor; wherein the public key includes composite number n; the private key is made up of the factorization of n; a message m=$(m_1, m_2)$ to be encrypted is made up of at least components $m_1$ and $m_2$; an encryption function f(x) is iterated a total of L times, with c=$(c_1, c_2)$=$f^L(m)$, $c_1$, and $c_2$ being integral numbers; f(m)=$(f_1(m), f_2(m))$ being applicable, and $f_1$= $(m_1 \text{ op}_1 m_2)$ mod n as well as $f_2$=$(m_1, \text{op}_2 m_2)$ mod n; the encryption function f(x) being selected in such a way that the encryption iteration can be reversed by the L-fold solution of a quadratic equation modulo n, it thus being possible to retrieve the original message from the encrypted information c=$(c_1, c_2)$, wherein a multivaluedness of the quadratic equation is eliminated by additional bits of $a_i$ and $b_i$ to obtain a set of roots and by calculating a parity and a Jacobi symbol which, in the case of prime numbers of form 3 mod 4, can be communicated by 2bits per iteration step.

2. The method of claim 1, wherein general iterations $f_1$=$(k_1 \cdot m_1 + k_2 \cdot m_2)$ mod n as well as $f_2$=$k_3 \cdot m_1 \cdot m_2$ mod n are used, constants being part of the public key.

3. The method of claim 1, wherein the composite number n as public key contains more than two factors.

4. The method of claim 1, wherein the message is now made up of an N-tuple m=$(m_1 \ldots m_N)$, the formula for the Lth iteration step using dependencies of N values in each iteration step.

5. The method of claim 4, wherein the multivaluedness is resolved by additional bits that are derived from the values obtained in each iteration.

6. The method of claim 1, wherein the multivaluedness is resolved by redundancy in the transmitted data.

7. The method of claim 1, wherein n is a product of a plurality of large prime numbers.

8. The method of claim 7, wherein $\text{op}_1$ is an addition and $\text{op}_2$ is a multiplication.

9. The method of claim 1, wherein $\text{op}_1$ is an addition and $\text{op}_2$ is a multiplication.

10. A method for generating a signature using a processor, comprising:

generating using the processor a signature by interchanging the encryption and decryption steps, including functions for encrypting data according to an asymmetrical method, based on a factorization problem, having a public key and a private key; wherein the public key includes a composite number n; the private key being made up of the factorization of n; a message m=$(m_1, m_2)$ to be encrypted is made up of at least components $m_1$ and $m_2$; an encryption function f(x) is iterated a total of L times, with c=$(c_1, c_2)$=$f^L(m)$; f(m)=$(f_1(m), f_2(m))$ being applicable, and $f_1$=$(m_1 \text{op}_1 m_2)$ mod n as well as $f_2$=$(m_1, \text{op}_2 m_2)$ mod n; the encryption function f(x) being selected in such a way that the encryption iteration can be reversed by the L-fold solution of a quadratic equation modulo n, it thus being possible to retrieve the original message from the encrypted information $c=(c_1, c_2)$, $c_1$ and $c_2$ being integral numbers; wherein a multivaluedness of the quadratic equation is eliminated by additional bits of $a_i$ and $b_i$ to obtain a set of roots and by calculating a parity and a Jacobi symbol which, in the case of prime numbers of form 3 mod 4, can be communicated by 2 bits per iteration step.

11. The method of claim 10, wherein n is a product of a plurality of large prime numbers, and $op_1$ is an addition and $op_2$ is a multiplication.

12. A data carrier storage for a computer, comprising:
storage of a software for the computer, the software being instructions configured to be executed by the computer, the instructions which, when executed by the computer, cause the performance of functions for encrypting data according to an asymmetrical method, based on a factorization problem, having a public key and a private key; wherein the public key includes a composite number n, the private key being made up of the factorization of n; a message $m=(m_1, m_2)$ to be encrypted is made up of at least components $m_1$ and $m_2$; an encryption function $f(x)$ is iterated a total of L times, with $c=(c_1, c_2)=f^L(m)$; $f(m)=(f_1(m),f_2(m))$ being applicable, and $f_1=(m_1, op_1 m_2)$ mod n; the encryption function $f(x)$ being selected in such a way that the encryption iteration can be reversed by the L-fold solution of a quadratic equation modulo n, it thus being possible to retrieve the original message from the encrypted information $c=(c_1, c_2)$, $c_1$, and $c_2$ being integral numbers; wherein a multivaluedness of the quadratic equation is eliminated by additional bits of $a_i$ and $b_i$ to obtain a set of roots and by calculating parity and a Jacobi symbol which, in the case of prime numbers of form 3 mod 4, can be communicated by 2 bits per iteration step.

13. The method of claim 12, wherein n is a product of a plurality of large prime numbers, and $op_1$ is an addition and $op_2$ is a multiplication.

14. A computer system, comprising:
a device that executes a method, the method having software for a computer, comprising functions for encrypting data according to an asymmetrical method, based on a factorization problem, having a public key and a private key; wherein the public key includes a composite number n, the private key being made up of the factorization of n; a message $m=(m_1, m_2)$ to be encrypted is made up of at least components $m_1$ and $m_2$; an encryption function $f(x)$ is iterated a total of L times, with $c=(c_1, c_2)=f^L(m)$; $f(m)=(f_1(m),f_2(m))$ being applicable, and $f_1=(m_1, op_1 m_2)$ mod n as well as $f_2=(m_1 op_2 m_2)$ mod n; the encryption function $f(x)$ being selected in such a way that the encryption iteration can be reversed by the L-fold solution of a quadratic equation modulo n, it thus being possible to retrieve the original message from the encrypted information $c=(c_1, c_2)$, $c_1$, and $c_2$ being integral numbers; wherein a multivaluedness of the quadratic equation is eliminated by additional bits of $a_i$ and $b_i$ to obtain a set of roots and by calculating a parity and a Jacobi symbol, in the case of prime numbers of form 3 mod 4, can be communicated by 2 bits per iteration step.

15. The method of claim 14, wherein n is a product of a plurality of large prime numbers, and $op_1$ is an addition and $op_2$ is a multiplication.

* * * * *